(12) United States Patent
Wang et al.

(10) Patent No.: US 11,879,968 B2
(45) Date of Patent: Jan. 23, 2024

(54) SIMULTANEOUS BEAMFORMING AND MULTIPLE INPUT-MULTIPLE OUTPUT (MIMO) SCHEMES IN RADAR SYSTEM

(71) Applicant: TEXAS INSTRUMENTS INCORPORATED, Dallas, TX (US)

(72) Inventors: Dan Wang, Allen, TX (US); Sandeep Rao, Bangalore (IN); Adeel Ahmad, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 378 days.

(21) Appl. No.: 17/217,584

(22) Filed: Mar. 30, 2021

(65) Prior Publication Data
US 2022/0317285 A1    Oct. 6, 2022

(51) Int. Cl.
| | |
|---|---|
| *G01S 13/931* | (2020.01) |
| *G01S 7/288* | (2006.01) |
| *G01S 13/34* | (2006.01) |
| *G01S 13/44* | (2006.01) |
| *G01S 13/58* | (2006.01) |
| *H04B 7/212* | (2006.01) |

(52) U.S. Cl.
CPC .......... *G01S 13/931* (2013.01); *G01S 7/2883* (2021.05); *G01S 13/34* (2013.01); *G01S 13/449* (2013.01); *G01S 13/583* (2013.01); *H04B 7/212* (2013.01)

(58) Field of Classification Search
CPC ...... G01S 13/931; G01S 13/34; G01S 13/449; G01S 13/583; H04B 7/212
USPC .......................................................... 340/436
See application file for complete search history.

(56) References Cited

U.S. PATENT DOCUMENTS

| | | | |
|---|---|---|---|
| 2016/0363651 A1* | 12/2016 | Lim | G01S 13/426 |
| 2020/0309933 A1* | 10/2020 | Ray | G01S 13/282 |
| 2020/0348389 A1* | 11/2020 | Laghezza | H04B 1/30 |
| 2021/0364614 A1* | 11/2021 | Loesch | G01S 13/42 |
| 2022/0099837 A1* | 3/2022 | Crouch | G01S 17/931 |

OTHER PUBLICATIONS

Fast-Chirp FDMA MIMO Radar System Using Range-Division Multiple-Access and Doppler-Division Multiple-Access, IEEE Transactions on Microwave Theory and Techniques, IEEE, USA vol. 69, No. 1, Dec. 10, 2020, pp. 1136-1148 (Year: 2020).*

* cited by examiner

*Primary Examiner* — Kerri L McNally
(74) *Attorney, Agent, or Firm* — Michael T. Gabrik; Frank D. Cimino (57) ABSTRACT

A radar system comprises a set of transmitters and a processor coupled to the set of transmitters. The processor is configured to modulate a first portion of a chirp in a chirp frame according to a first phase. The processor is further configured to modulate a second portion of the chirp in the chirp frame according to a second phase and configured to combine the first and second portions of the chirp to produce a phase-modified chirp. The processor is further configured to instruct the set of transmitters to transmit the phase-modified chirp by applying time division multiple access (TDMA) and by directing radio frequency energy according to a target angle and a target gain.

20 Claims, 4 Drawing Sheets

SIMULTANEOUS BEAMFORMING AND MULTIPLE INPUT-MULTIPLE OUTPUT (MIMO) SCHEMES IN RADAR SYSTEM

BACKGROUND

Radar systems are widely deployed and used in various applications for consumer and government use. System components in radar systems vary depending on the end application. Transmitter beamforming and multiple input-multiple output (MIMO) are two different operation modes for a radar system. Transmitter beamforming can enhance the detection range over a limited field-of-view by shaping the beam at the transmitter. Transmitter beamforming is achieved by applying phase shifts to the individual transmitters resulting in a shaped beam due to constructive/destructive interference of the transmitted beams from an antenna array of the radar system. MIMO achieves more precise angle resolution with an extensive field of view. The extensive field of view is achieved using a plurality of transmitter modules coupled to a processing unit which controls signal transmissions and signal processing. The two operation modes typically operate independently for different applications.

SUMMARY

In accordance with at least one example of the disclosure, a radar system comprises a set of transmitters and a processor coupled to the set of transmitters. The processor is configured to modulate a first portion of a chirp in a chirp frame according to a first phase. The processor is further configured to modulate a second portion of the chirp in the chirp frame according to a second phase and configured to combine the first and second portions of the chirp to produce a phase-modified chirp. The processor is further configured to instruct the set of transmitters to transmit the phase-modified chirp by applying time division multiple access (TDMA) and by directing radio frequency energy according to a target angle and a target gain.

In accordance with at least one example of the disclosure, a radar method comprises a processor of a radar system generating a chirp frame comprising a plurality of linear frequency modulated chirps. The radar method comprises modulating a first portion of a chirp of the plurality of linear frequency modulated chirps according to a first phase and modulating a second portion of the chirp in the chirp frame according to a second phase. The radar method comprises combining the first and second portions of the chirp to produce a phase-modified chirp and instructing a set of transmitters of the radar system to transmit the phase-modified chirp by applying TDMA and by directing radio frequency energy according to a target angle and a target gain. The radar method comprises demodulating a received signal to obtain the chirp based on a difference in phase values of the first phase and the second phase.

In accordance with at least one example of the disclosure, a non-transitory computer-readable medium comprises executable code, which, when executed by a processor, causes the processor to identify phase centers of an antenna architecture of a radar system to obtain a virtual element array. The non-transitory computer-readable medium causes the processor to modulate a first portion of a chirp in a chirp frame according to a first phase and modulate a second portion of the chirp in the chirp frame according to a second phase. The non-transitory computer-readable medium causes the processor to combine the first and second portions of the chirp to produce a phase-modified chirp. The non-transitory computer-readable medium causes the processor to instruct a set of transmitters of the radar system to transmit the phase-modified chirp by applying TDMA based on the phase centers and by directing radio frequency energy according to a target angle and a target gain according to the virtual element array.

BRIEF DESCRIPTION OF THE DRAWINGS

For a detailed description of various examples, reference will now be made to the accompanying drawings in which.

DETAILED DESCRIPTION

Modern vehicles include various types of sensors. A radar system is an example of such a sensor. A radar system in a vehicle may detect safety hazards, such as vehicles in adjacent lanes or pedestrians. For the vehicle to safely operate in a variety of driving conditions, the radar system in the vehicle should have long detection range and high range and angle resolution over a wide field-of-view.

In some technologies, hardware limitations make it difficult to simultaneously achieve long detection range and high angle resolution over a wide field-of-view. Consequently, one of these features can be improved only at the expense of the other. This difficulty may be resolved by implementing additional hardware in the radar system, but the added hardware would increase vehicular weight, costs, and technical complexity.

This disclosure describes various examples of a radar system that is configured to use both beamforming and MIMO schemes simultaneously to achieve long detection range and high angle resolution. An antenna array of the radar system includes a plurality of transmitters that are grouped into transmitter sets. Each transmitter set achieves high coherent gain for long detection range by implementing transmitter beamforming. In addition, a first MIMO scheme, Doppler division multiple access (DDMA), is applied to the transmitter sets for higher angle resolution. Further, a second MIMO scheme, TDMA, is applied to the transmitter sets that share common transmitters to further increase virtual array size. With the combination of transmitter beamforming and MIMO schemes (e.g., TDMA and DDMA), the radar system described herein simultaneously achieves long detection range and high angle resolution. The radar system described herein may be implemented in both vehicular and non-vehicular applications.

Transmit beamforming is a technique that focuses radio frequency (RF) energy from the radar system in a particular direction. The side to side direction is commonly referred to as the azimuth and the up and down direction as the elevation. Beamforming can be used to focus the radar over both azimuth and elevations. This can be accomplished by programming each transmit channel with a specific phase value, such that the radiation power is sent towards a desired direction when enabling all the TX at the same time. The phase value programmed to each TX channel is calculated based on the antenna positions and the desired angle to steer the beam. In addition, TX beamforming requires the silicon to provide a way to precisely program the phase value for each TX channel.

The DDMA waveform ensures orthogonality of the transmit signals and avoids some of the problems in the application of Frequency Division Multiple Access (FDMA) and Code Division Multiple Access (CDMA) for the radar system. The DDMA waveform achieves signal separation by shifting the transmit signals of different transmitters to different Doppler frequencies indicated by a change in phase of the signal.

The TDMA waveform includes a precision timing requirement beyond starting and stopping the channel. Unique time slots are defined within a repeating frame such that a single frequency band can service multiple transmitters. Each transmitter adheres to the respective time slot to avoid interference between the transmitters.

While aspects herein are described primarily in the context of a radar system in use with a vehicle, these aspects may also be applicable to any system or circuit on any type of vehicle. For example, the example methods and systems described in this disclosure can be similarly applied to a circuit mounted to an aircraft, a motorcycle, a drone, or the like. As another example, the example methods and systems described in this disclosure can be similarly applied to a utility vehicle for industrial applications. These and other aspects are described in greater detail below.

Figure 1:
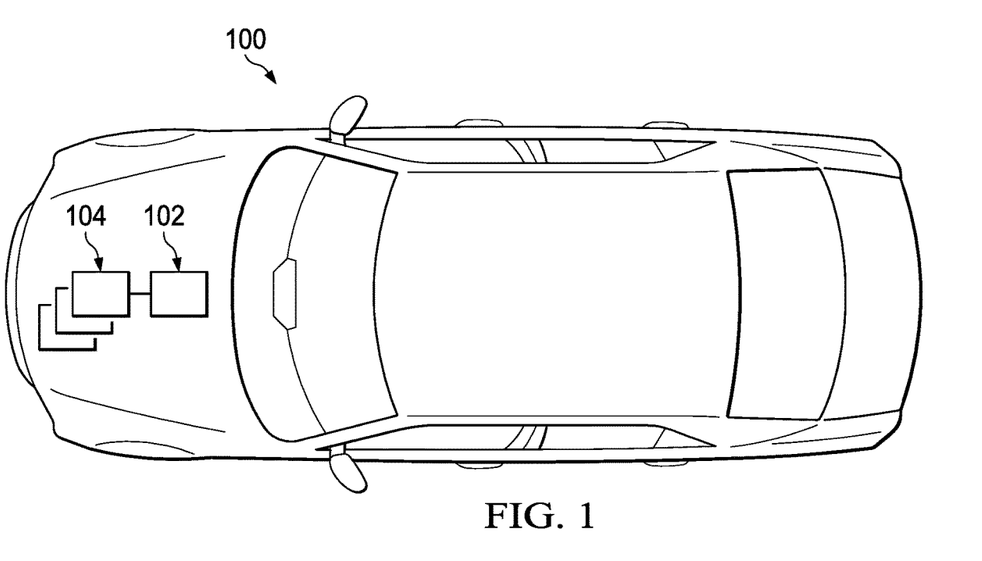
FIG. 1 is a block diagram of a radar system according to an example of this disclosure.

FIG. 1 illustrates an example radar system 100. As shown, the radar system 100 includes a transceiver terminal 102 and a plurality of antennas 104. In some examples, the transceiver terminal 102 and the antennas 104 are installed within a vehicle. In an example, the transceiver terminal 102 generates a signal to send to the antennas 104. The signal comprises a plurality of chirps to determine a distance of objects within the beam-width of the antennas 104. The radar system 100 compares a time when the signal is sent to the time the signal is received to determine the distance of objects within the beam-width of the antennas 104. In an example, the vehicle is a self-driving vehicle, an aircraft, a motorcycle, a drone, or the like.

In an example, the transceiver terminal 102 is a software defined radio (SDR), a field-programmable gate array (FPGA), an application-specific integrated circuit (ASIC), a digital signal processor (DSP), or the like. In an example, the radar system 100 can transmit a radio frequency (RF) signal between 76 gigahertz (GHz) and 81 GHz, but is not limited to this frequency range depending on the application.

In an example, the antennas 104 are in an antenna array design based on applying a genetic algorithm (GA) to search for the optimal array element position, suppress the MIMO pattern grating lobe, and improve the direction-of-arrival (DOA) estimation performance. In an example, the antennas 104 include a one-dimensional array of elements, where the elements are uniformly spaced from one another and emit electromagnetic energy in an omnidirectional pattern. In an example, the antennas 104 are categorized as monopoles, dipoles, slot antennas, or the like.

In an example, the radar system 100 can achieve both short range and mid-range detection and maintain a high-precision angle resolution. Short range is considered to be 0 meters (m) to 50 m, mid-range is considered to be 50 m to 120 m, and long range is considered to be 120 m to 150 m or greater. A high-precision angle resolution is considered to be a beam-width less than 10 degrees (°).

Figure 2:
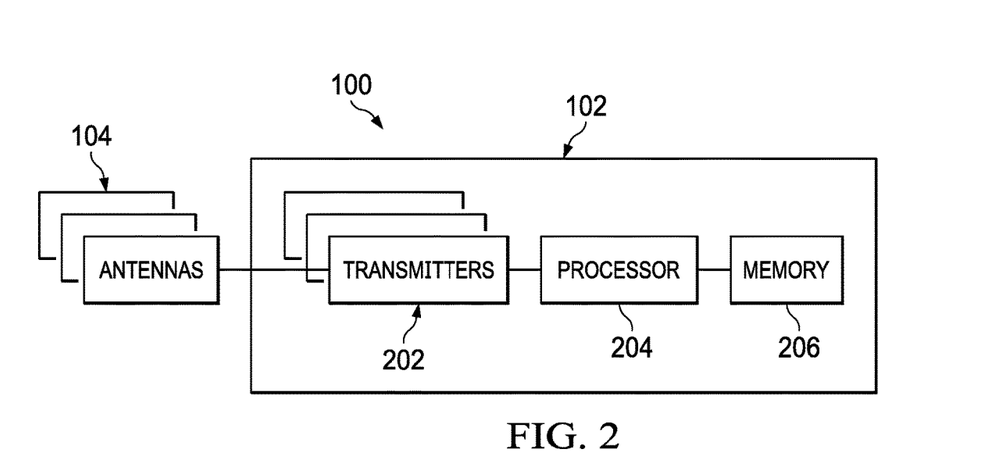
FIG. 2 is a block diagram of a radar system according to an example of this disclosure.

FIG. 2 illustrates an example radar system 100. As shown, the radar system 100 includes the transceiver terminal 102 and the antennas 104. The transceiver terminal 102 includes a plurality of transmitters 202, a processor 204, and a memory 206. In an example, a portion of the memory 206 may be non-transitory memory and a portion of the memory 206 may be transitory memory. The transmitters 202 are coupled to the processor 204. The processor 204 is coupled to the memory 206. In an example, each of the transmitters 202 are coupled to at least one of the antennas 104.

In an example, the processor 204 generates and transmits a signal to each of the transmitters 202. The signal indicates to the transmitters 202 a frequency at which the transmitters will operate, a bandwidth for operation, a pulse repetition frequency (PRF), a PRI, or the like. In an example, the signal enters each of the transmitters 202 and traverses a signal chain (not shown) in each of the transmitters 202 before being transmitted to the antennas 104. After the signal enters the transmitters 202, the signal is filtered by a digital filter where any spurious bits outside of a predefined frame size are removed. After the digital filter, the signal is provided to a digital-to-analog converter (DAC). A clock signal from the transmitters 202 are used as the clock within the DAC. After the DAC, the signal is further filtered by a first low pass filter. After the low pass filter, the signal is transmitted to an intermediate frequency (IF) amplifier. After the IF amplifier the signal is further filtered by a second low pass filter to mitigate any spurious signals which interfered with the signal in the IF amplifier. After the second low pass filter, the signal is provided to a mixer, where the signal is mixed with a signal from a phase locked loop (PLL) or voltage controlled oscillator (VCO) depending on the application. After the mixer, the signal passes through a third low pass filter to filter any spurious signals which interfered with the signal in the mixer. After the third low pass filter, the signal is sent to a power amplifier which amplifies the signal. After the power amplifier, at least one phase shifter applies phase shifts to the signal resulting in a shaped beam due to constructive/destructive interference of the transmitted beams. The signal is transmitted to the antennas 104, where the signal couples with antenna elements of the antenna 104 for transmission of electromagnetic energy through free-space.

Figure 3:
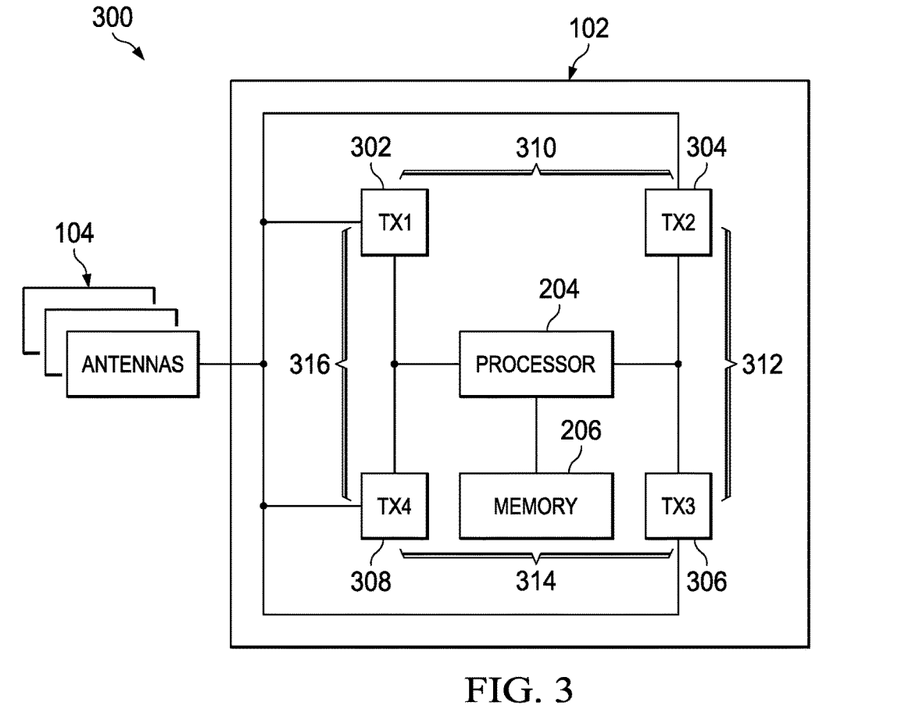
FIG. 3 is a block diagram of a radar system according to an example of this disclosure.

FIG. 3 illustrates an example radar system 300. As shown, the radar system 300 includes a transceiver terminal 102 and a plurality of antennas 104. The transceiver terminal 102 includes the processor 204, the memory 206, a first transmitter 302, a second transmitter 304, a third transmitter 306, a fourth transmitter 308, a first subset of transmitters 310, a second subset of transmitters 312, a third subset of transmitters 314, and a fourth subset of transmitters 316. The first transmitter 302, the second transmitter 304, the third transmitter 306, and the fourth transmitter 308 are each coupled to the processor 204 and the antennas 104. The first transmitter 302 and the second transmitter 304 are included in the first subset of transmitters 310. The second transmitter 304 and the third transmitter 306 are included in the second subset of transmitters 312. The third transmitter 306 and the fourth transmitter 308 are included in the third subset of transmitters 314. The first transmitter 302 and the fourth transmitter 308 are included in the fourth subset of transmitters 316. In an example, TDMA can be applied to subsets of transmitters that share a transmitter. For example, the first subset of transmitters 310 and the second subset of transmitters 312 share the second transmitter 304 using TDMA to alternate between transmitting a signal from the first subset of transmitters 310 at a first time and transmitting a signal from the second subset of transmitters 312 at a second time.

In another example, DDMA can be applied simultaneously to, or independently from, TDMA by the processor 204. Simultaneously in this case means operating at the same time. For example, DDMA can be applied to the radar system 300 as follows. The processor 204 mixes signals from the first transmitter 302 and the second transmitter 304 and applies a first phase change to obtain a first phase mixed signal and mixes signals from the third transmitter 306 and the fourth transmitter 308 and applies a second phase change to obtain a second phase mixed signal. The processor 204 then mixes the first phase mixed signal and the second phase mixed signal to obtain a DDMA signal. The first phase change and the second phase change are based on Doppler shifts, which allow the first phase change and the second phase change to be orthogonal.

In yet another example, each of the transmitter subsets can perform TX beamforming in addition to the TDMA/DDMA output. The beamforming is accomplished by programming each transmit channel with a specific phase value, such that beam can be steered to a desired angle based on constructive/destructive interference of the electromagnetic energy from the antennas 104. The phase value programmed to each TX channel is calculated based on the antenna positions and the desired angle to steer the beam in the processor 204. In addition, TX beamforming requires the silicon to provide a way to precisely program the phase value for each TX channel.

In another example, FDMA can be applied simultaneously to, or independently from, TDMA and DDMA by the processor 204. For example, the first subset of transmitters 310 and the second subset of transmitters 312 share the second transmitter 304 using FDMA to transmit a signal from the first subset of transmitters 310 at a first frequency and transmit a signal from the second subset of transmitters 312 at a second frequency. The first frequency and the second frequency are orthogonal such that no interference occurs between the first subset of transmitters 310 and the second subset of transmitters 312. In another example, the radar system 300 can use FDMA, TDMA, and/or DDMA individually or simultaneously. The first subset of transmitters 310, the second subset of transmitters 312, the third subset of transmitters 314, and the fourth subset of transmitters 316 are not limited to the configuration listed above and can comprise any configuration of the first transmitter 302, the second transmitter 304, the third transmitter 306, and the fourth transmitter 308 0.

In an example, the memory 206 comprises instructions to implement a user interface. The user interface receives instructions from a user which can control the radar system 300 to operate in various operation modes. In an example, the operation modes correspond with beamforming and MIMO, where an operation mode corresponding with MIMO comprises a plurality of options such as TDMA, DDMA, and FDMA. The user can select which operation mode best suits the application of the radar system 300. For example, the user can select only to apply TDMA when the radar system is configured to medium range resolution.

Figure 4:
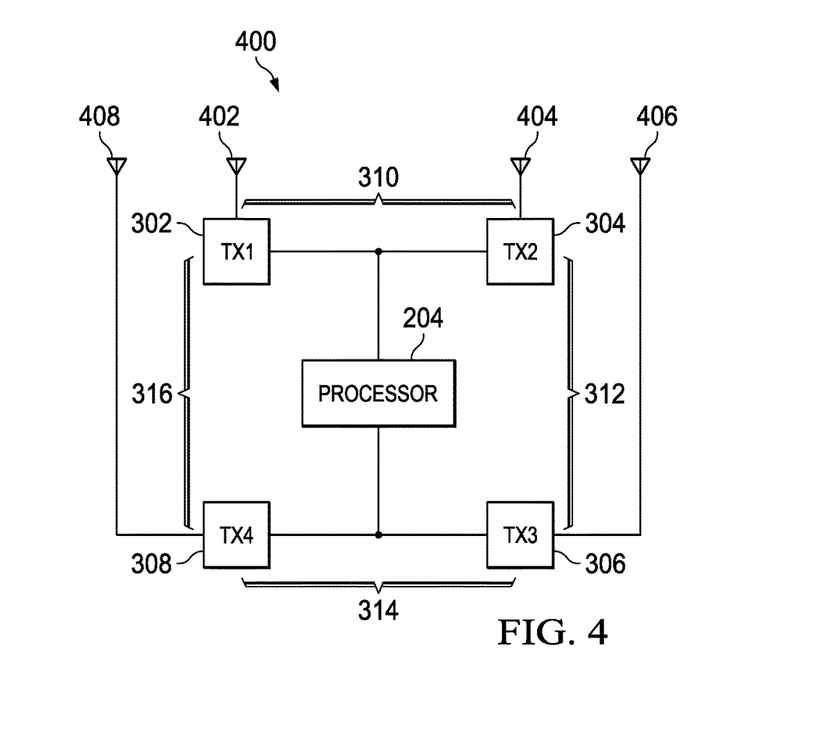
FIG. 4 is an illustration of a radar system according to an example of this disclosure.

FIG. 4 illustrates an example radar system 400. As shown, the radar system 400 includes the processor 204, the first transmitter 302, the second transmitter 304, the third transmitter 306, the fourth transmitter 308, the first subset of transmitters 310, the second subset of transmitters 312, the third subset of transmitters 314, the fourth subset of transmitters 316, a first antenna 402, a second antenna 404, a third antenna 406, and a fourth antenna 408. The processor 204 is coupled to each of the first transmitter 302, the second transmitter 304, the third transmitter 306, and the fourth transmitter 308. The first transmitter 302 is coupled to the first antenna 402, the second transmitter 304 is coupled to the second antenna 404, the third transmitter 306 is coupled to the third antenna 406, and the fourth transmitter 308 is coupled to the fourth antenna 408.

In an example, according to a first time by applying TDMA, the first transmitter 302 and the second transmitter 304 of the first subset of transmitters 310 and the third transmitter 306 and the fourth transmitter 308 of the third subset of transmitters 314 are active. The processor 204, by applying DDMA, shifts phase components of signals from the first transmitter 302 and the second transmitter 304 by a first phase amount corresponding to a Doppler frequency of the application of the radar system 400. Further, the processor 204, by applying DDMA, shifts phase components of signals from the third transmitter 306 and the fourth transmitter 308 by a second phase amount corresponding to the Doppler frequency. The first transmitter 302, the second transmitter 304, the third transmitter 306, and the fourth transmitter 308 output the signals to the first antenna 402, the second antenna 404, the third antenna 406, and the fourth antenna 408. The signals radiating from each of the first antenna 402, the second antenna 404, the third antenna 406, and the fourth antenna 408 combine to generate a first chirp. In an example, the processor 204, by applying beamforming, shifts the phase components of the signals from the first transmitter 302 and the second transmitter 304 by a first phase offset and shifts phase components of signals from the third transmitter 306 and the fourth transmitter 308 by a second phase offset. The first phase offset and the second phase offset result in the output of the signals from the first antenna 402, the second antenna 404, the third antenna 406, and the fourth antenna 408 to constructively/destructively interfere and direct the beam of the radar system 400. In an example, the first phase offset and the second phase offset correspond to angles that cause interference of the beam of the radar system 400 to be directed up to +/−90° from the azimuth of the radar system 400 and/or 180° in elevation.

In another example, according to a second time by applying TDMA, the first transmitter 302 and the fourth transmitter 308 of the fourth subset of transmitters 316 and the second transmitter 304 and the third transmitter 306 of the second subset of transmitters 312 are active. The processor 204, by applying DDMA, shifts phase components of signals from the first transmitter 302 and the fourth transmitter 308 by the first phase. Further, the processor 204, by applying DDMA, shifts phase components of signals from the second transmitter 304 and the third transmitter 306 by the second phase. The first transmitter 302 outputs a first signal to the first antenna 402, the second transmitter 304 outputs a second signal to the second antenna 404, the third transmitter 306 outputs a third signal to the third antenna 406, and the fourth transmitter 308 outputs a fourth signal to the fourth antenna 408. The signals radiating from each of the first antenna 402, the second antenna 404, the third antenna 406, and the fourth antenna 408 combine to generate a second chirp. In an example, the processor 204, by applying beamforming, shifts the phase components of the signals from the first transmitter 302 and the fourth transmitter 308 by a first phase offset and shifts phase components of signals from the second transmitter 304 and the third transmitter 306 by a second phase offset. The signals shifted by the first phase offset and the second phase offset result in the output of the signals from the first antenna 402, the second antenna 404, the third antenna 406, and the fourth antenna 408 to constructively/destructively interfere to direct the beam of the radar system 400. In an example, the first phase offset and the second phase offset correspond to angles that cause interference of the beam of the radar system 400 to be directed up to +/−90° from the azimuth and 180° in elevation.

Figure 5A:
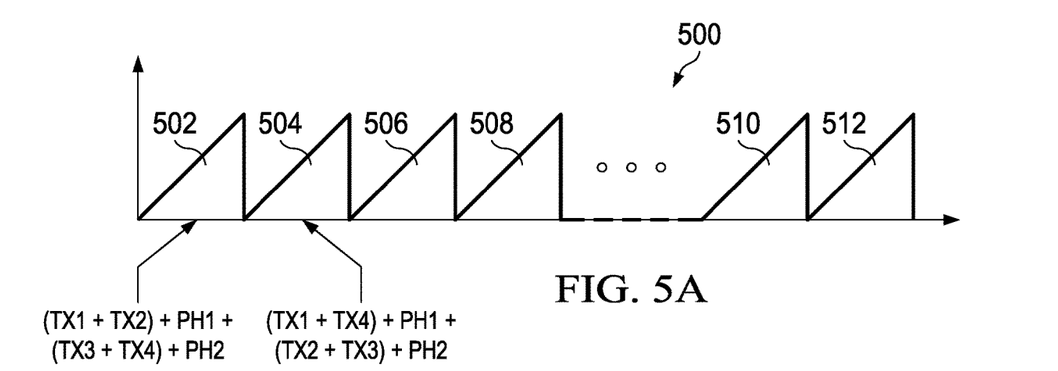
FIGS. 5A-5C are illustrations of chirp patterns of a chirp set according to an example of this disclosure.
Figure 5B:
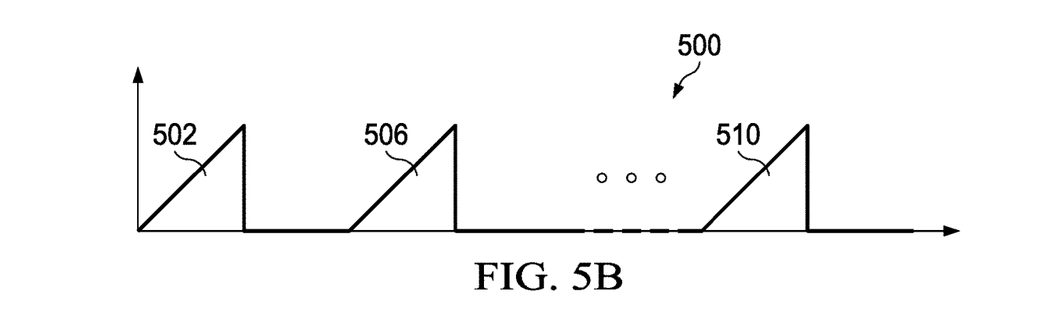
Figure 5C:
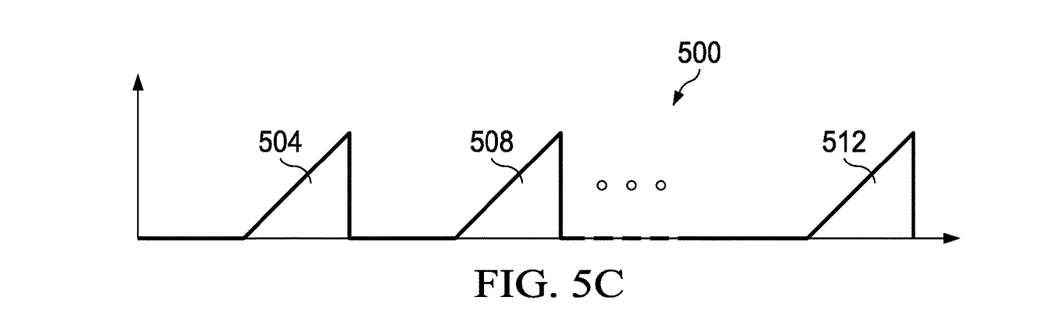

FIG. 5A illustrates an exemplary chirp set 500 from the radar system 400 comprising different patterns according to TDMA and DDMA. Chirp 1 502, chirp 3 506, and chirp N 510 of the chirp set 500 correspond to a first pattern based on a first time set. Chirp 2 504, chirp 4 508, and chirp N+1 512 correspond to a second pattern based on a second time set. Chirp 1 502 is based on the first pattern at a first time of the first time set and comprises a mixed signal from outputs of a first transmitter subset and a second transmitter subset. The first transmitter subset outputs signals from a first transmitter and second transmitter that are shifted by a first phase. The second transmitter subset outputs signals from a third transmitter and a fourth transmitter shifted by a second phase. Chirp 2 504 is based on the second pattern at a first time of the second time set and comprises a mixed signal from outputs of a third transmitter subset and a fourth transmitter subset. The third transmitter subset outputs signals from the first transmitter and the fourth transmitter that are shifted by the first phase. The fourth transmitter subset outputs signals from the second transmitter and the third transmitter shifted by the second phase. The first pattern and the second pattern alternate based on a time duration of each the first time set and the second time set for the remaining chirps of the chirp set 500. Each time the pattern alternates for the chirp set 500, a new time frame of either the first time set or the second time set occurs based on the TDMA scheme. Alternating between the first pattern and the second pattern allows the radar system 400 to achieve simultaneous application of TDMA and DDMA. In an example, the radar system 400 additionally is configured to receive a signal corresponding with the chirp set 500 and demodulate the signal based on the first pattern and the second pattern. The first pattern and the second pattern are the same as described above. The radar system 400 is able to demodulate the chirp set 500 according to the first pattern and the second pattern such that the radar system 400 obtains information of the chirps and determine the corresponding transmitters for further signal processing by the radar system 400 to form a virtual MIMO array which provides angle of arrival information. FIG. 5B illustrates the chirp 1 502, the chirp 3 506, and the chirp N 510 of the chirp set 500 that correspond to the first pattern based on the first time set. FIG. 5C illustrates chirp 2 504, chirp 4 508, and chirp N+1 512 of the chirp set 500 that correspond to the second pattern based on the second time set. In an example, the chirp set 500 can follow various patterns not included in this disclosure. For example, the chirp set 500 can follow three patterns or more based on the application of the radar system 400.

In an example, the time duration of each chirp of the chirp set 500 can be between 20 microseconds (μs) and 30 μs, but is not limited to this range depending on the application. In an example, the number of chirps in the chirp set 500 can be between 64 and 512, but is not limited to this range depending on the application.

Figure 6:
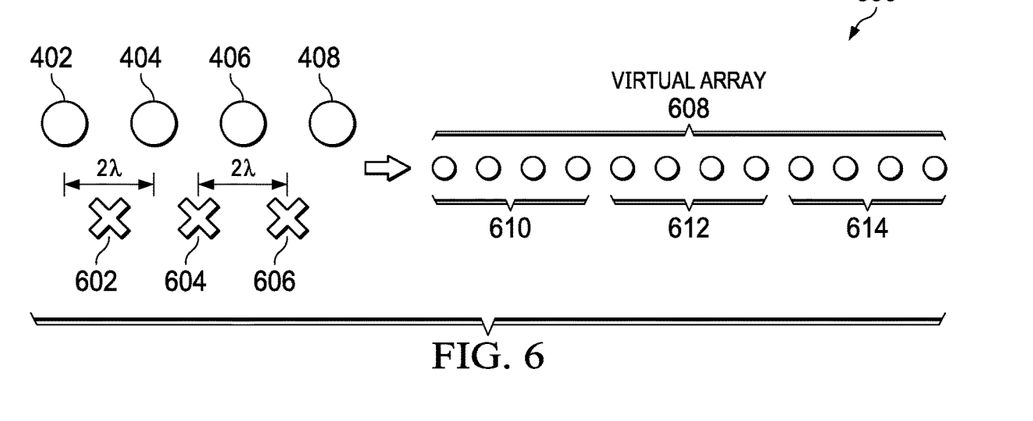
FIG. 6 is an illustration of a virtual array of antennas according to an example of this disclosure.

FIG. 6 illustrates an example MIMO configuration 600. As shown, the MIMO configuration 600 includes the first antenna 402, the second antenna 404, the third antenna 406, the fourth antenna 408, a first phase center 602, a second phase center 604, a third phase center 606, a virtual array 608, a first set of virtual elements 610, a second set of virtual elements 612, and a third set of virtual elements 614.

In an example, the arrangement of the first antenna 402, the second antenna 404, the third antenna 406, and the fourth antenna 408 creates phase centers at the first phase center 602, the second phase center 604, and the third phase center 606. A phase center is a location of a point associated with the antenna such that, if it is taken as the center of a sphere whose radius extends into the far-field, the phase of a given field component over the surface of the radiation sphere may be constant, at least over that portion of the surface where the radiation is significant. In an example, the distance between antennas is two times the wavelength (2X) for the application which makes the output from each of the antennas orthogonal to each of the adjacent antennas.

In an example, from a radar system using TDMA and DDMA, the radar system can transmit a signal with reference to each of the first phase center 602, the second phase center 604, and the third phase center 606 which results in the first set of virtual elements 610, the second set of virtual elements 612, and the third set of virtual elements 614. The virtual elements correspond to each phase center acting as an independent emission source to the other phase centers and has access to each antenna independently. The virtual elements can improve the degree of freedom and the angle of estimation resolution performance of the radar system. For example, in a typical MIMO system with four antennas, the orthogonality between the phase centers can be used to achieve an effective transmission of four phase centers across the four antennas resulting in 16 virtual elements.

In examples of this disclosure, the radar system 400 simultaneously applies TDMA and DDMA. The simultaneous use of TDMA and DDMA results in an increase of range and beam-width achievable by the radar system 400. However, the simultaneous use of TDMA and DDMA decreases the total number of available virtual elements of the array down from 16 virtual elements to 12 virtual elements. The decrease in virtual elements is based on the radar system 400 having transmitter subsets, where the phase centers of two transmitter subsets overlap. The overlap of the phase centers makes only one phase center useful for the MIMO configuration.

Figure 7:
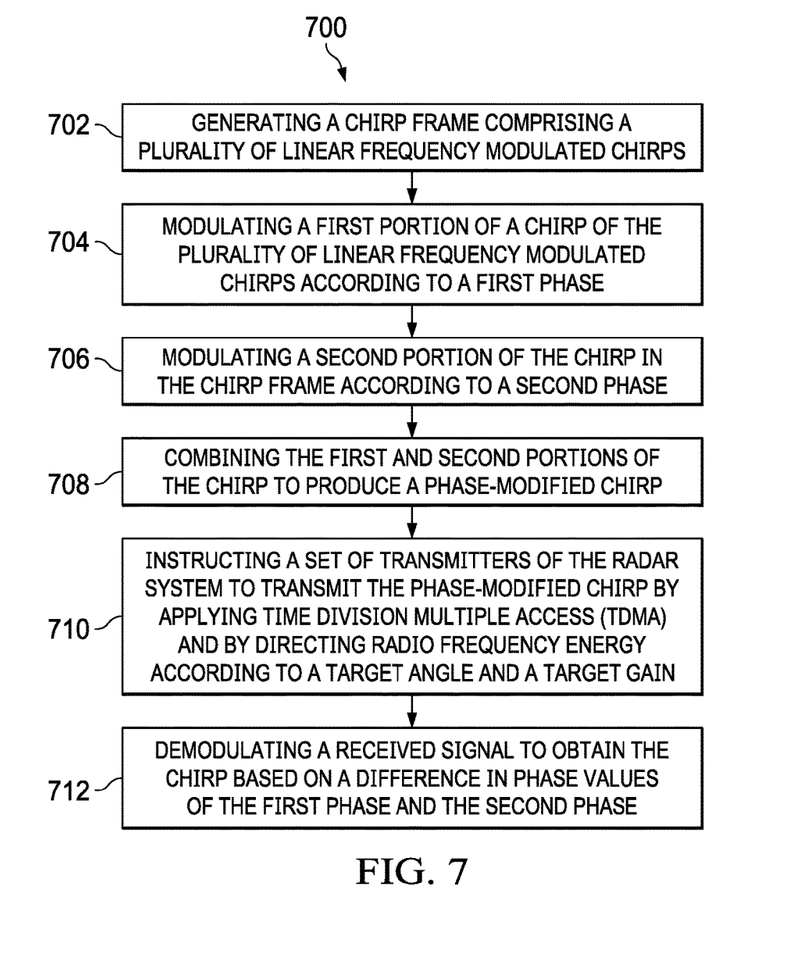
FIG. 7 is a flow diagram of a method for a radar system according to an example of this disclosure.

FIG. 7 is a flow chart of an example method 700 for a radar system. The method 700 includes generating a chirp frame comprising a plurality of linear frequency modulated chirps (702).

The method 700 includes modulating a first portion of a chirp of the plurality of linear frequency modulated chirps according to a first phase (704).

The method 700 includes modulating a second portion of the chirp in the chirp frame according to a second phase (706).

The method 700 includes combining the first and second portions of the chirp to produce a phase-modified chirp (708).

The method 700 includes instructing a set of transmitters of the radar system to transmit the phase-modified chirp by applying time division multiple access (TDMA) and by directing RF energy according to a target angle and a target gain (710).

The method 700 includes demodulating a received signal to obtain the chirp based on a difference in phase values of the first phase and the second phase (712).

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

What is claimed is:

1. A radar system, comprising:
    a set of transmitters including a first subset of transmitters and a second subset of transmitters, the first and second subsets of transmitters having a transmitter in common; and
    a processor coupled to the set of transmitters, the processor configured to:
        modulate a first portion of a chirp in a chirp frame according to a first phase;
        modulate a second portion of the chirp in the chirp frame according to a second phase;
        combine the first and second portions of the chirp to produce a phase-modified chirp; and
        instruct the first and second subsets of transmitters to transmit the phase-modified chirp using time division multiple access (TDMA) and by directing radio frequency energy according to a target angle and a target gain.

2. The radar system of claim 1, wherein:
    the processor is configured to instruct the first and second subsets to transmit, using TDMA, additional chirps of the chirp frame.

3. The radar system of claim 2, wherein the processor is configured to:
    receive a signal including the phase-modified chirp; and
    perform a Doppler fast Fourier transform (FFT) on the received signal.

4. The radar system of claim 2, wherein the processor is configured to combine the first and second portions of the chirp to produce the phase-modified chirp based on applying Doppler division multiple access (DDMA).

5. The radar system of claim 4, wherein the set of transmitters is configured to transmit, using TDMA, DDMA, and beamforming simultaneously, the phase-modified chirp.

6. The radar system of claim 2, wherein the processor is configured to instruct the first and second subsets to transmit the phase-modified chirp and the additional chirps based on a first pattern.

7. The radar system of claim 6, wherein the processor is configured to instruct the first and second subsets to transmit the phase-modified chirp and the additional chirps based on a second pattern, wherein the first pattern and the second pattern alternate based on a time duration.

8. A radar method, comprising:
    generating, by a processor of a radar system, a chirp frame comprising a plurality of linear frequency modulated chirps;
    modulating, by the processor, a first portion of a chirp of the plurality of linear frequency modulated chirps according to a first phase;
    modulating, by the processor, a second portion of the chirp in the chirp frame according to a second phase;
    combining, by the processor, the first and second portions of the chirp to produce a phase-modified chirp; and
    instructing, by the processor, first and second subsets of transmitters, of a set of transmitters of the radar system, to transmit the phase-modified chirp using time division multiple access (TDMA) and by directing radio frequency energy according to a target angle and a target gain, the first and second subsets of transmitters having a transmitter in common;
    demodulating, by the processor, a received signal to obtain the chirp based on a difference in phase values of the first phase and the second phase; and
    performing a Doppler fast Fourier transform (FFT) on the received signal.

9. The radar method of claim 8, wherein the radar system is embedded in a vehicle and further comprising detecting, by the processor, an obstacle on a roadway on which the vehicle is driving.

10. The radar method of claim 9, further comprising:
instructing the first and second subsets of transmitters to transmit additional chirps of the chirp frame using TDMA.

11. The radar method of claim 10, further comprising:
instructing, by the processor, the first and second subsets to transmit the phase-modified chirp and the additional chirps based on a first pattern.

12. The radar method of claim 11, further comprising:
instructing, by the processor, the first and second subsets to transmit the phase-modified chirp and the additional chirps based on a second pattern, wherein the first pattern and the second pattern alternate based on a time duration.

13. The radar method of claim 9, further comprising:
combining, by the processor, the first and second portions of the chirp to produce the phase-modified chirp based on applying Doppler division multiple access (DDMA).

14. The radar method of claim 13, further comprising:
instructing, by the processor, the set of transmitters to transmit the phase-modified chirp using TDMA, DDMA, and beamforming simultaneously.

15. A non-transitory computer-readable medium storing executable code, which, when executed by a processor, causes the processor to:
identify phase centers of an antenna architecture of a radar system to obtain a virtual element array;
modulate a first portion of a chirp in a chirp frame according to a first phase;
modulate a second portion of the chirp in the chirp frame according to a second phase;
combine the first and second portions of the chirp to produce a phase-modified chirp; and
instruct a set of transmitters of the radar system to transmit the phase-modified chirp by applying time division multiple access (TDMA) based on the phase centers and by directing radio frequency energy according to a target angle and a target gain according to the virtual element array.

16. The computer-readable medium of claim 15, wherein:
the set of transmitters includes a first subset of transmitters and a second subset of transmitters, the first and second subsets having a transmitter in common, and
the executable code further causes the radar system to instruct the first and second subsets to transmit, using TDMA, the phase-modified chirp and additional chirps of the chirp frame.

17. The computer-readable medium of claim 16, wherein the executable code further causes the radar system to:
receive a signal including the phase-modified chirp; and
perform a Doppler fast Fourier transform (FFT) on the received signal.

18. The computer-readable medium of claim 16, wherein the executable code further causes the radar system to combine the first and second portions of the chirp to produce the phase-modified chirp based on applying Doppler division multiple access (DDMA).

19. The computer-readable medium of claim 18, wherein the executable code further causes the radar system to instruct the set of transmitters to transmit, using TDMA, DDMA, and beamforming simultaneously, the phase-modified chirp.

20. The computer-readable medium of claim 16, wherein the executable code further causes the radar system to:
instruct the first and second subsets to transmit the phase-modified chirp and the additional chirps based on a first pattern; and
instruct the first and second subsets to transmit the phase-modified chirp and the additional chirps based on a second pattern, wherein the first pattern and the second pattern alternate based on a time duration.

* * * * *